(12) United States Patent
Nolin

(10) Patent No.: US 6,325,588 B1
(45) Date of Patent: Dec. 4, 2001

(54) APPARATUS FOR REMOTELY OPERATING AN AUGER

(75) Inventor: Karl W. Nolin, Spencer, IA (US)

(73) Assignee: Pride Products, Inc., Dickens, IA (US)

( * ) Notice: Subject to any disclaimer, the term of this patent is extended or adjusted under 35 U.S.C. 154(b) by 0 days.

(21) Appl. No.: 09/501,781

(22) Filed: Feb. 10, 2000

(51) Int. Cl.⁷ .................................................. B65G 67/02
(52) U.S. Cl. ...................... 414/526; 414/523; 414/326; 192/30 R; 198/674; 222/413; 477/175
(58) Field of Search ..................... 414/523, 326, 414/526, 808, 809; 192/31, 30 R; 198/674, 657; 222/410, 413; 56/DIG. 15; 477/175

(56) References Cited

U.S. PATENT DOCUMENTS

| | | | |
|---|---|---|---|
| 4,522,553 | * 6/1985 | Nelson et al. | 414/526 |
| 5,013,208 | 5/1991 | Grieshop | 414/526 |
| 5,100,281 | 3/1992 | Grieshop | 414/526 |
| 5,733,094 | 3/1998 | Bergkamp | 414/526 |
| 5,746,261 | 5/1998 | Bowling | 144/24.12 |
| 5,888,044 | 3/1999 | Baskerville | 414/523 |
| 6,120,233 | * 9/2000 | Adam | 414/526 X |

OTHER PUBLICATIONS

Sudenga Industries, Inc., Gravity Wagon Auger, Mar., 1997, Place of Publication not known.

Bulk Seed Tender, Introducing the Friesen Bulk Seed Tender Seed Loading and Delivery System, No date available, Place of Publication not known.

* cited by examiner

*Primary Examiner*—Frank E. Werner
(74) *Attorney, Agent, or Firm*—Simmons, Perrine, Albright & Ellwood, PLC

(57) ABSTRACT

The present invention is directed to the remote operation of an auger attached to a portable unit for storing and transporting particulate matter. A bin having a number of sidewalls which converge downwardly and inwardly to a discharge end secured to a frame. A discharge chute is attached to the bin to receive particulate matter from the bin and transfer the particulate matter from the bin. An unloading auger is secured within the discharge chute and powered by a motor which is secured to the frame. In general operation, a clutch assembly engages the motor to the unloading auger causing the particulate matter to be unloaded. A user may use a transmitter to send a signal to a receiver which increases or decreases the output of the motor and engages or disengages the clutch such that the auger may be started or stopped. The transmitter and receiver may communicate using a radio signal. Additionally, wheels may support the frame and a trailer hitch may be attached. To properly direct the unloading of the particulate matter, a flexible spout may be attached to the discharge chute.

10 Claims, 4 Drawing Sheets

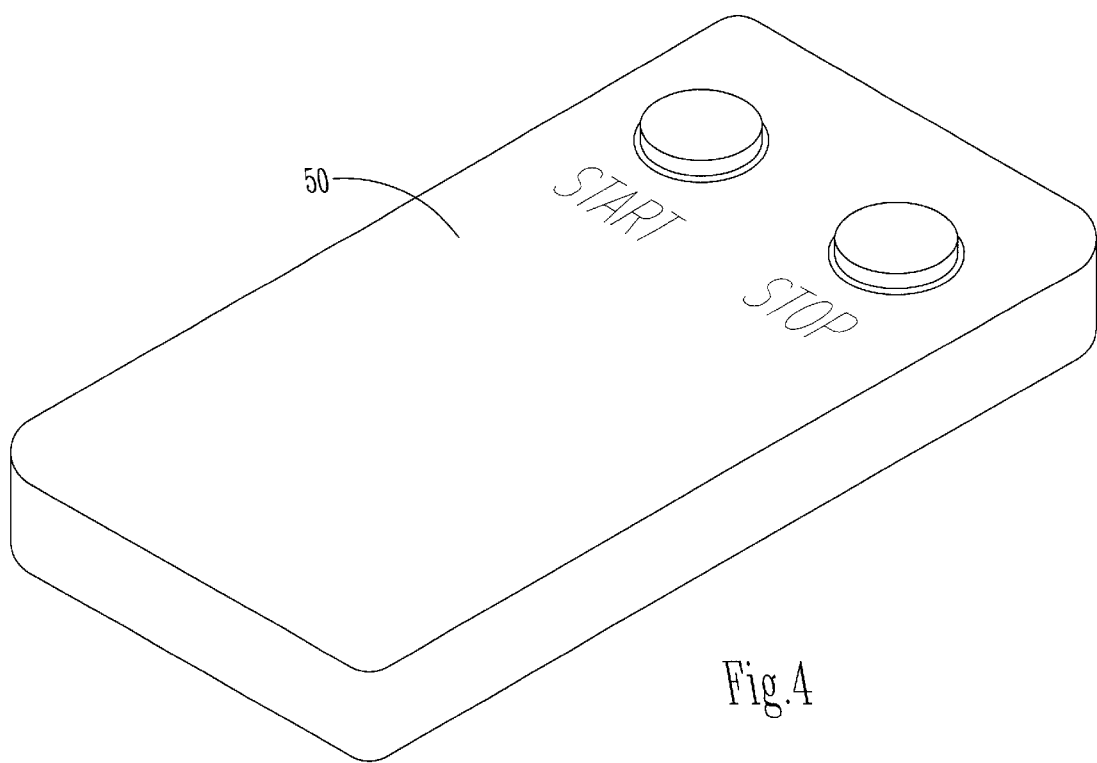

APPARATUS FOR REMOTELY OPERATING AN AUGER

BACKGROUND OF THE INVENTION

1. Field of the Invention

The present of the invention relates to the remote operation of an auger and more specifically, to using a radio signal to remotely operate an auger attached to a bin used to transport, store, and distribute particulate matter.

2. Problems in the Art

Bins equipped with augers are well-known in the art. The purpose of such bins is to transport, store, and distribute grain in a desired amount or to a desired location. Such auger equipped bins are a common sight on many of today's farms. Although prior art auger equipped bins have many desirable features, they also suffer from several problems. The starting and stopping of the flow of material from the augers of such bins currently requires the use of cables and pulleys or manual control. Other prior art auger equipped bins require the use of a hydraulic motor to regulate the flow of material. Such prior art requires a user to physically turn the unit on or off at the unit's location. This exposes the user to possibly severe weather conditions and/or environmental hazards. It is therefore desirable to allow a user turn an auger on or off and/or regulate the flow of material remotely.

Current auger equipped bins are designed to transport, store and distribute specific materials. It is therefore desirable to provide an auger equipped bin capable of handling a variety of materials.

Additionally, prior art auger equipped bins such as the grain cart shown in U.S. Pat. No. 5,733,094 to Bergkamp, et al., have been developed with discharge chutes adaptable to make the bin easier to store and transport. Such adaptable discharge chutes require a user to manually prepare the discharge chute for operation. Further, highway laws limit the height and width of bins including the discharge chute. It is therefore desirable to have a bin with a discharge chute affixed so as to require no adaptation by the user prior to operation of the auger. It is also desirable to have an auger equipped bin with an affixed discharge chute which is capable of traveling on highways and capable of being stored without the need to reposition the discharge chute.

The present invention is an apparatus and method for solving these and other problems.

3. Features of the Invention

It is therefore objective of the present invention to provide an auger assembly which may be remotely controlled by a user.

A further objective of the present invention is to provide an auger equipped bin capable of transporting, storing, and discharging various types of particulate matter.

Another objective of the present invention is to provide an auger equipped bin with a discharge chute that does not need to be repositioned for travel or storage.

A still further objective of the present invention is to allow a user to remain in a secured and comfortable environment while operating an auger equipped bin.

Another objective of the present invention is to provide a portable auger unit that allows a user to buy feed in bulk quantities and dispense desired amounts of that feed to specific locations.

A still further objective of the present invention is to allow a user to remain in a secured and comfortable environment while operating an auger equipped bin.

These, as well as other features, objects and advantages of the present invention, will become apparent from the following specification and claims.

SUMMARY OF THE INVENTION

The present invention generally comprises a portable unit for storing and transporting particulate matter which is capable of being operated by remote control. Initially, particulate matter is loaded into a bin which uses gravity feed to supply an unloading auger. The auger, which is located within a discharge chute, unloads particulate matter from the bin.

The bin is supported by a frame. Sidewalls of the bin converge downwardly and inwardly to a discharge end so that particulate matter may flow through the discharge end and into the discharge chute. Once in the discharge chute, particulate matter is discharged by operation of the unloading auger. The unloading auger is powered by a motor which is secured to the frame. The motor engages the auger upon receipt of a signal by a receiver which then increases or decreases the output of the motor. This increase in output causes the motor to engage a clutch assembly and operate a belt, chain, gear, shaft or other drive mechanism which transfers power from the motor to the auger.

The transmitter operated by the user sends the signal to the receiver and thereby operates the auger and discharges the particulate matter. Another signal sent by the user and received by the receiver decreases the output of the motor and disengages the clutch, thereby causing the discharge of particulate matter to cease.

Though the present invention has many uses in the farming industry, such as feeding on pasture for a rotation program, drought feeding, or winter feeding, it may also be used to allow horse owners to buy bulk oats, allow dog kennel owners to buy bulk dog food, and allow fish farm owners to transport feed to various ponds with ease. The portable unit can be used by farmers, ranchers, horse stable owners, wild game managers, seed producers, dog kennels, fish farms, zoos, and anyone needing to transport, store, and move dry bulk material.

BRIEF DESCRIPTION OF THE DRAWINGS

FIG. 4 is a top view of the transmitter used to operate the portable unit.

DETAILED DESCRIPTION OF THE PREFERRED EMBODIMENT

The present invention will be described as it applies to its preferred embodiment. It is not intended that the present invention be limited to the described embodiment. It is intended that the invention cover all modifications and alternatives which may included within the spirit and scope of the invention.

Figure 1:
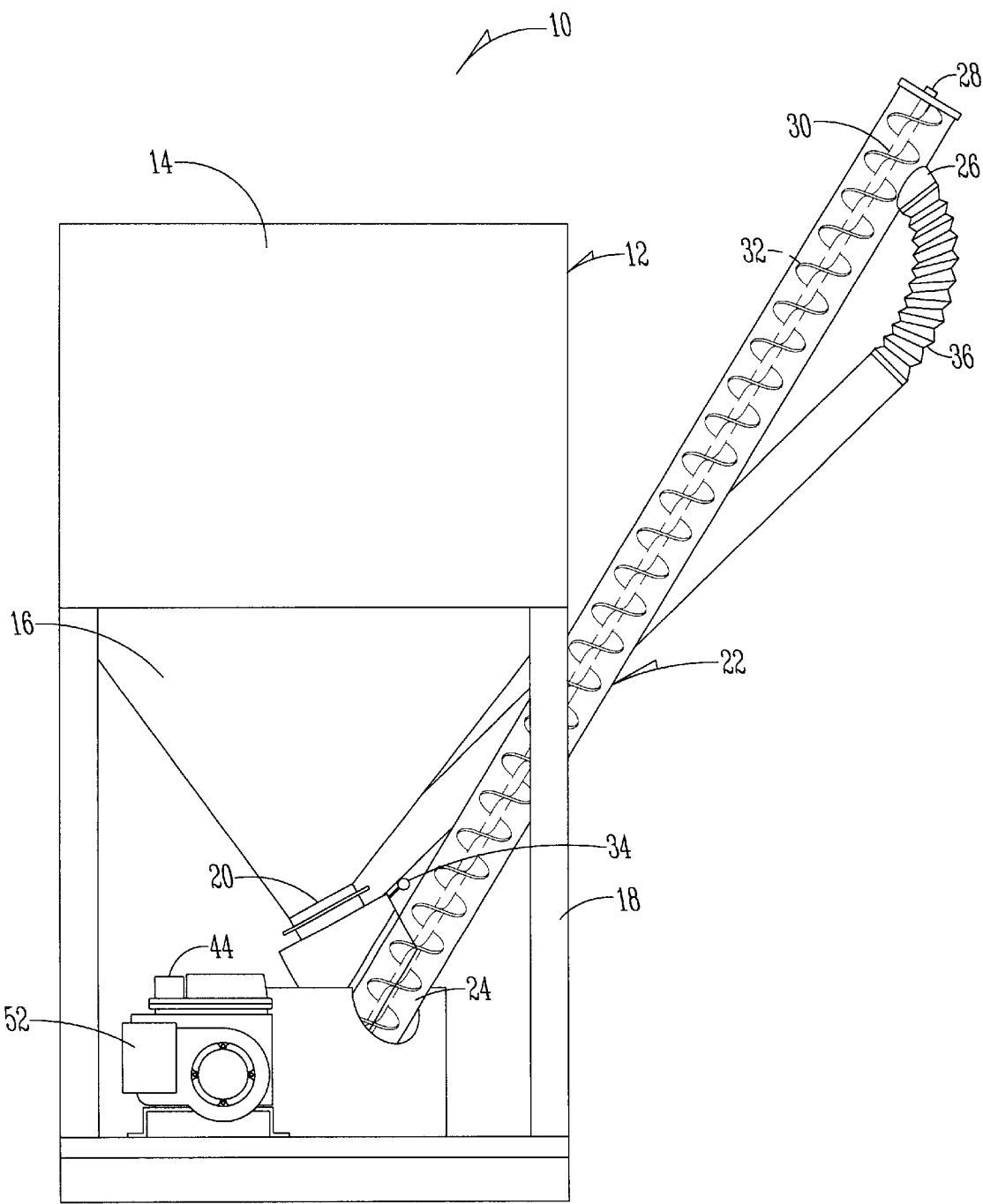
FIG. 1 is a side view of a portable unit for storing and transporting particulate matter.

Now, referring to the drawings, FIG. 1 the portable unit 10. The portable unit 10 is comprised of a bin 12 in which particulate matter is stored. Generally, the bin is of a size to hold one bulk seed bag or has a 50 bushel capacity for corn or beans. The bin 12 has four sidewalls 14 connected so as to form a box with no top or bottom. The open top allows for easy filling and tarping of the bin 12.

Connected to the sidewalls 14 are four support walls 16. These four support walls 16 converge downwardly and inwardly to a discharge end 20. This discharge end 20 is large enough to allow easy flow of particulate matter, including, but not limited to, grain, feed, and fertilizer. The flow of particulate matter through the discharge end 20 may be halted or regulated through the use of a retractable gate 34. With the retractable gate 34 open, particulate matter flows directly from the bin 12 into the discharge chute 22.

Within the discharge chute 22, an unloading auger 28 is mounted. The shaft 30 of the auger 28 runs along the radial axis of the discharge chute 22. Along the shaft 30 of the auger 28 are helical flights 32 which move particulate matter from the receiving end 24 of the discharge chute 22 to the discharge end 26 of the discharge chute 22. The helical flights 32 are generally of the high density polyethylene cupped variety so as to gently handle the particulate matter. Further, the low angle of attachment of the discharge chute 22 and the auger 28 relative to the bin 12 allows gentler handling of particulate matter.

Attached to the discharge end 26 of the discharge chute 22 is a flexible spout 36. The flexible spout 36 can be positioned in a myriad of ways to accommodate discharge of particulate matter into or onto a desired location. Further, the flexible spout 36 can be of a telescoping nature, as composed of several circumferential folding layers of plastic material, to allow a user to place particulate matter directly into most planter boxes or other specific areas.

Figure 2:
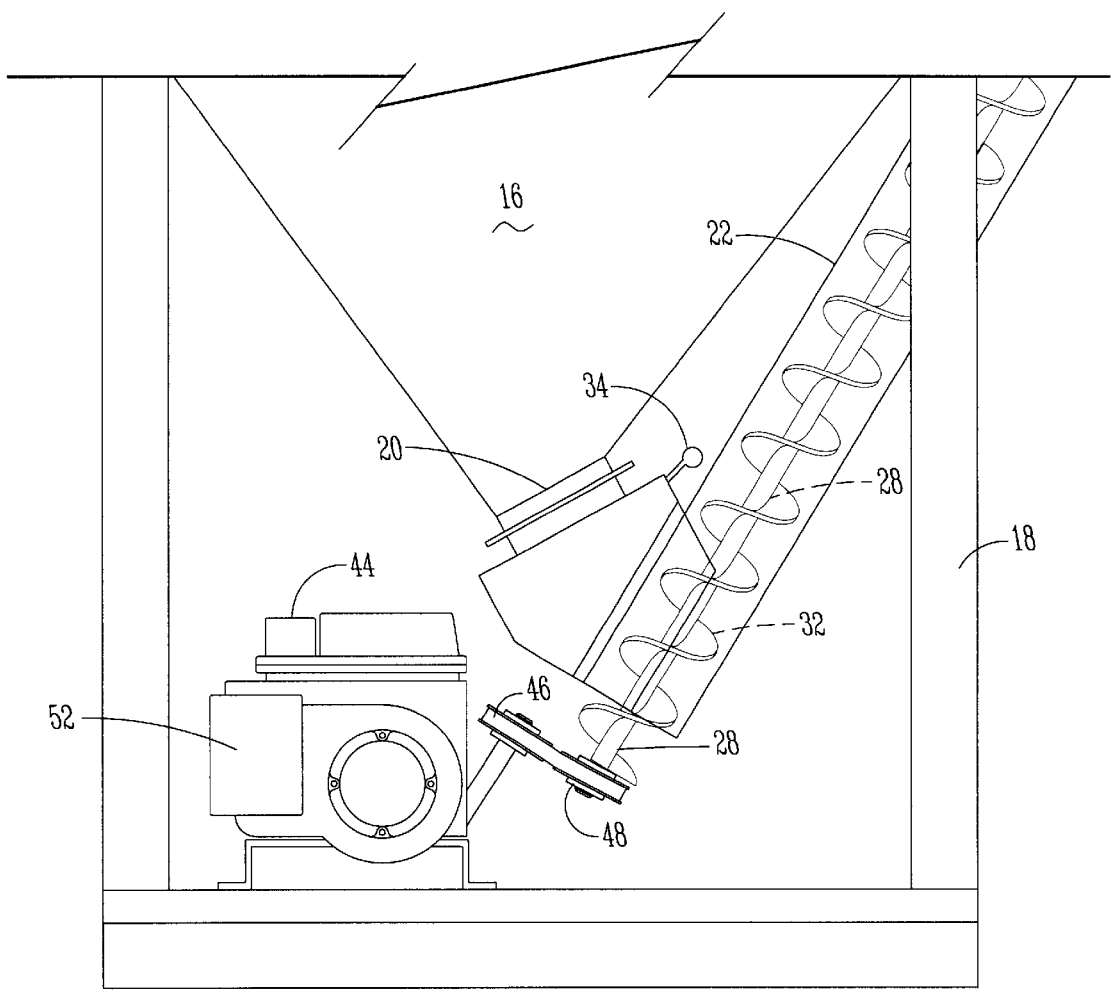
FIG. 2 is a fragmentary, side view of the portable unit of FIG. 1 with portions broken away to show detail of the auger motor and clutch interaction.

As shown in FIG. 2, the engine 44 is secured to the frame 18. A six horsepower Briggs & Stratton engine is preferred, providing enough power to allow the portable unit 10 to operate without the need for any hydraulics. the frame 18 supports the bin 12, auger 28 and the engine 44 and all other components. As shown in FIG. 1, the frame 18 may be of a stationary variety, allowing the portable unit 10 to be used for storage of particulate matter. Further the frame 18 may include lifting channels or brackets. Lifting channels allow the user to move or transport a portable unit 10 using a common forklift. Lifting brackets allow the user to move an empty portable unit 10 for better placement and storage of the portable unit 10.

Figure 3:
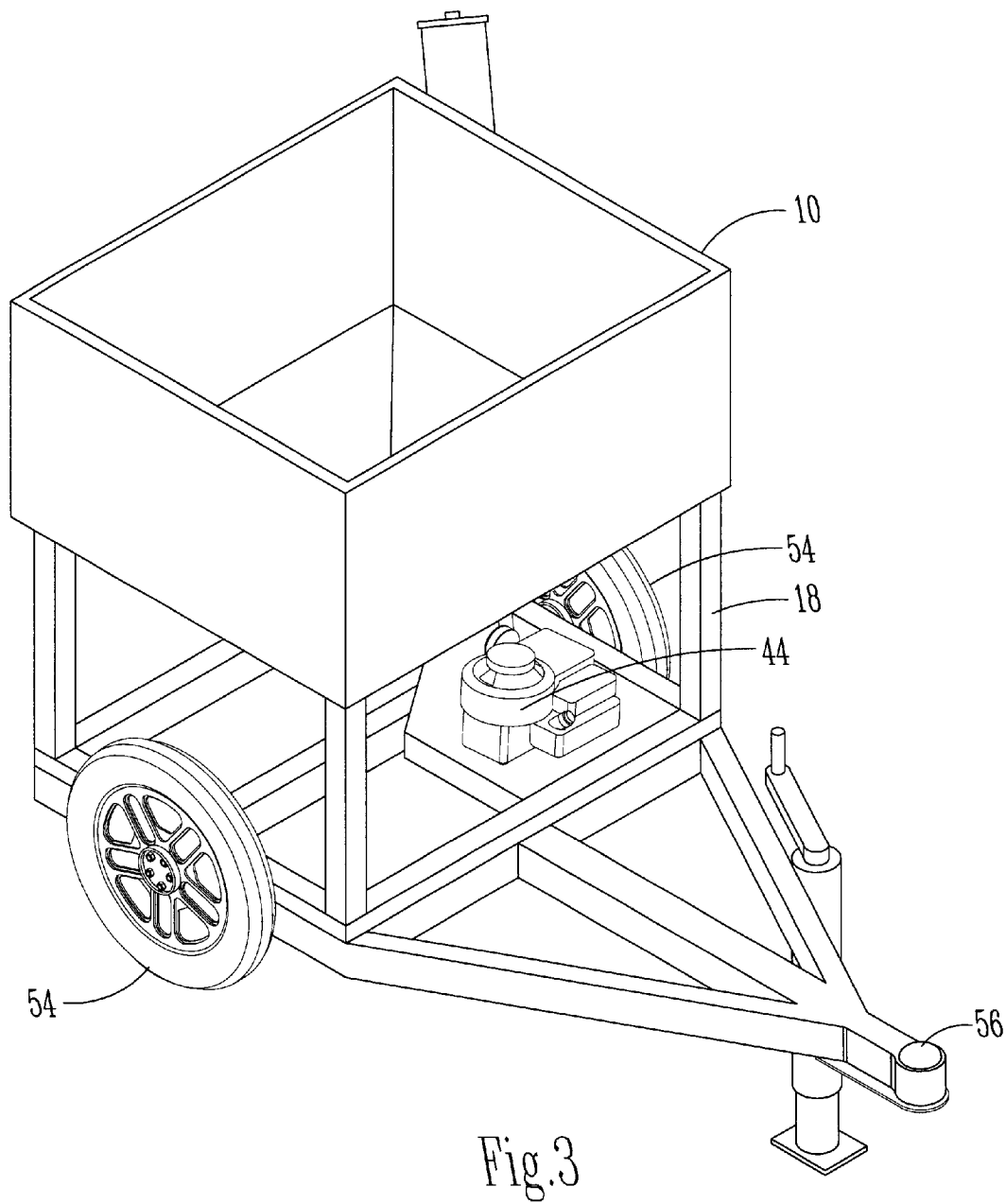
FIG. 3 is a top prospective view of the portable unit.

The portable unit 10 may be placed in or on various trailers or land based vehicles, such as pick up trucks, for transport. Additionally, as shown in FIG. 3, the portable unit 10 is configurable with a set of wheels 54 and a hitch 56. The wheels 54 are typically 215-75-15" tires mounted on opposite sides of the frame 18, though any wheels capable of supporting the portable unit 10 are acceptable. The hitch 56 is preferably a ball type hitch, though a pin hitch or any other method of attachment to a land based vehicle is acceptable.

Attached to the engine 44 is a receiver 52. The radio signal controlling the receiver 52 is sent by a transmitter 50. As shown in FIG. 4, the transmitter 50 is a wireless, battery operated unit as is commonly known in the art. While the preferred method of transmitting a user's input is using radio frequencies, other types of transmitters and receivers, such as infrared based systems may be used. The transmitter 50 is portable and allows the user to control the discharge of particulate matter from either the inside of a land based vehicle or other location and further allows the user to dispense particulate matter using the flexible spout 36 to a desired location and still control the flow of particulate matter while controlling the flexible spout 36.

Upon receipt of a radio signal, the receiver 52 increases the running speed of the engine 44 causing the engine to engage a centrifugal clutch 46. The centrifugal clutch 46 then engages a drive mechanism 48 such as belt or chain. The drive mechanism 48 connects the centrifugal clutch 46 to the shaft 30 of the auger 28. Once the clutch 46 is engaged, the shaft 30 of the auger 28 turns the helical flights 32 and moves the particulate matter from the discharge end 20 of the bin 12 through the discharge chute 22 and out the discharge end 26. When another radio signal is received by the receiver 52, the receiver 52 slows the running speed of the engine 44 so as to disengage the centrifugal clutch 46. When the centrifugal clutch 46 is disengaged, no power is supplied to the shaft 30 of the auger 28 and the flow of particulate matter from the bin 12 ceases.

A general description of the present invention as well as a preferred embodiment of the present invention has been set forth above. Those skilled in the art to which the present invention pertains will recognize and be able to practice additional variations in the methods and systems described which fall within the teachings of this invention. Accordingly, all such modifications and additions are deemed to be within the scope of the invention which is to be limited only by the claims appended hereto.

What is claimed is:

1. A portable unit for storing and transporting particulate matter comprising:
    a bin including a plurality of sidewalls which converge downwardly and inwardly to a discharge end such that particulate matter may flow through said discharge end;
    a frame secured to said bin;
    a discharge chute including a receiving end secured to receive particulate matter from the bin at the bin's discharge end and a discharge end through which particulate matter exits the discharge chute;
    an unloading auger secured within said discharge chute;
    a motor secured to said frame;
    a centrifugal clutch assembly to operatively engage the motor to the unloading auger;
    a receiver which increases or decreases a running speed of the motor and thereby engages or disengages the centrifugal clutch;
    a transmitter which controls the function of the receiver; and
    wherein a remote control uses a radio signal to send instructions to the receiver.

2. The unit of claim 1 further comprising a plurality of wheels supporting said frame.

3. The unit of claim 2 further comprising a trailer hitch.

4. The unit of claim 1 further comprising a flexible spout with one end attached so as to receive the particulate material from the discharge end of the discharge chute.

5. The unit of claim 1 wherein the auger and discharge chute are transportable without requiring folding or removing.

6. A remote controlled flow control portable material bin comprising: a frame having coupled thereto a bin with a plurality of opposing sides which converge downwardly and inwardly to a discharge area;
    a material lifting member adapted and configured for engaging material to be moved from said discharge area;
    said material lifting member having a discharge end;
    a flow control assembly coupled to said material lifting member which is adapted and configured to control flow of material from said discharge end;
    a wireless signal receiver operatively coupled to and adapted for manipulating said flow control assembly, which receiver is adapted and configured to receive wireless flow control signals;

wherein said material lifting member is an auger; and wherein said flow control assembly is a frame mounted combination of a variable speed internal combustion motor and a centrifugal clutch.

7. A portable material bin of claim 6 wherein the receiver is a radio receiver.

8. A portable material bin of claim 7 wherein said bin is coupled to a ball-type trailer hitch.

9. A portable material bin of claim 8 wherein said flow control signals are generated by a handheld, battery operated transmitter.

10. A portable material bin of claim 8 which has two wheels on opposing sides of said frame and has a trailer lift jack adjacent to said ball-type trailer hitch and said portable material bin is free of any hydraulics being coupled to said material lifting member.

* * * * *